(12) United States Patent  (10) Patent No.: US 7,812,940 B2
Daigle  (45) Date of Patent: Oct. 12, 2010

(54) ANGULAR POSITION SENSOR FOR RELATIVE ATTITUDE SENSING

(75) Inventor: Marc Daigle, Concord, MA (US)

(73) Assignee: Optical Alchemy, Inc., Nashua, NH (US)

( * ) Notice: Subject to any disclaimer, the term of this patent is extended or adjusted under 35 U.S.C. 154(b) by 101 days.

(21) Appl. No.: 12/354,454

(22) Filed: Jan. 15, 2009

(65) Prior Publication Data

US 2009/0180107 A1  Jul. 16, 2009

Related U.S. Application Data

(60) Provisional application No. 61/021,193, filed on Jan. 15, 2008.

(51) Int. Cl.
*G01B 11/26* (2006.01)
(52) U.S. Cl. ...................................... 356/138
(58) Field of Classification Search ................... 356/138
See application file for complete search history.

(56) References Cited

U.S. PATENT DOCUMENTS

| | | | |
|---|---|---|---|
| 4,396,945 A | 8/1983 | DiMatteo et al. | |
| 4,664,524 A | 5/1987 | Hattori et al. | |
| 4,815,843 A * | 3/1989 | Tiefenthaler et al. | ........ 356/128 |
| 5,162,642 A | 11/1992 | Akamatsu et al. | |

* cited by examiner

*Primary Examiner*—Roy Punnoose
(74) *Attorney, Agent, or Firm*—BainwoodHuang

(57) ABSTRACT

A disclosed sensor includes a light emitter configured to transmit an emitted light beam having a range of wavelengths toward a reflecting element that is configured to produce a reflected light beam having a particular wavelength that is a function of an angle of incidence of the emitted light beam from a normal of the reflecting element. The sensor also includes a color sensor in proximity to and fixed relative to the light emitter and configured to (i) receive the reflected light beam, (ii) detect the particular wavelength of the reflected light beam, and (iii) transmit a color signal indicating the particular wavelength of the reflected light beam. The sensor further includes processing circuitry disposed in electrical communication with the color sensor and configured to receive the color signal and calculate the angle of incidence based on the particular wavelength.

17 Claims, 6 Drawing Sheets

ANGULAR POSITION SENSOR FOR RELATIVE ATTITUDE SENSING

CROSS REFERENCE TO RELATED APPLICATIONS

This Patent Application claims the benefit of U.S. Provisional Patent Application No. 61/021,193 filed on Jan. 15, 2008, entitled, "REMOTE ATTITUDE SENSOR", the contents and teachings of which are hereby incorporated by reference in their entirety.

BACKGROUND

A typical vehicle or platform (such as an aircraft, UAV, boat, car, or truck) is capable of moving in one or more directions. Such a platform may include absolute attitude determination capability which allows the platform to utilize various sensors to ascertain the current platform attitude relative to a fixed external reference. The attitude of a platform is its orientation with respect to this defined frame of reference.

An Inertial Navigation System (INS) is a navigation aid that uses a computer and motion sensors to continuously track the position, orientation, and velocity (direction and speed of movement) of a vehicle without the need for external references. An inertial navigation system includes at least a computer and a module containing accelerometers, gyroscopes, or other motion-sensing devices. The INS is initially provided with its position and velocity from another source (a human operator, a GPS satellite receiver, etc.), and thereafter computes its own updated position and velocity by integrating information received from the motion sensors. A feature of an INS is that it requires no external references in order to determine its position, orientation, or velocity once it has been initialized. Some INSs place the accelerometers on a vibrationally isolated module such as a gimbaled gyrostabilized module.

SUMMARY

Certain INSs may be incorporated into platforms that also have absolute attitude determination capability. In these cases it may be advantageous to have the INS incorporate information from the absolute attitude sensors to generate more robust results. However, such incorporation can result in a degree of error due to differences between the respective reference frames of the INS and the absolute attitude sensors.

In certain INSs that are incorporated into platforms that have absolute attitude determination capability and that incorporate information from absolute attitude sensors, there is a need to minimize the degree of error caused by the motion of the platform relative to the vibrationally isolated module. This degree of error can be minimized if the knowledge of the relative attitude of the moving platform to a vibration isolated module is known.

A technique for reducing the degree of error includes using a fast refresh, non-contact optical arrangement to give instantaneous attitude measurements such as pitch, yaw, and roll from a platform to a vibration isolated sensor. A grating or holographic element changes color as white light or any broadband source illuminates it as a function of its angle relative to the light source. The source light is diffracted by the grating and only a certain color is reflected. The reflected light illuminates a color sensor to ascertain the hue (color of the light). The hue is analyzed by a processor to determine an angle of incidence which corresponds to an attitude angle.

Generally, a disclosed sensor includes a light emitter configured to transmit an emitted light beam having a range of wavelengths toward a reflecting element that is configured to produce a reflected light beam having a particular wavelength that is a function of an angle of incidence of the emitted light beam from a normal of the reflecting element. The sensor also includes a color sensor in proximity to and fixed relative to the light emitter and configured to (i) receive the reflected light beam, (ii) detect the particular wavelength of the reflected light beam, and (iii) transmit a color signal indicating the particular wavelength of the reflected light beam. The sensor further includes processing circuitry disposed in electrical communication with the color sensor and configured to receive the color signal and calculate the angle of incidence based on the particular wavelength.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1A:
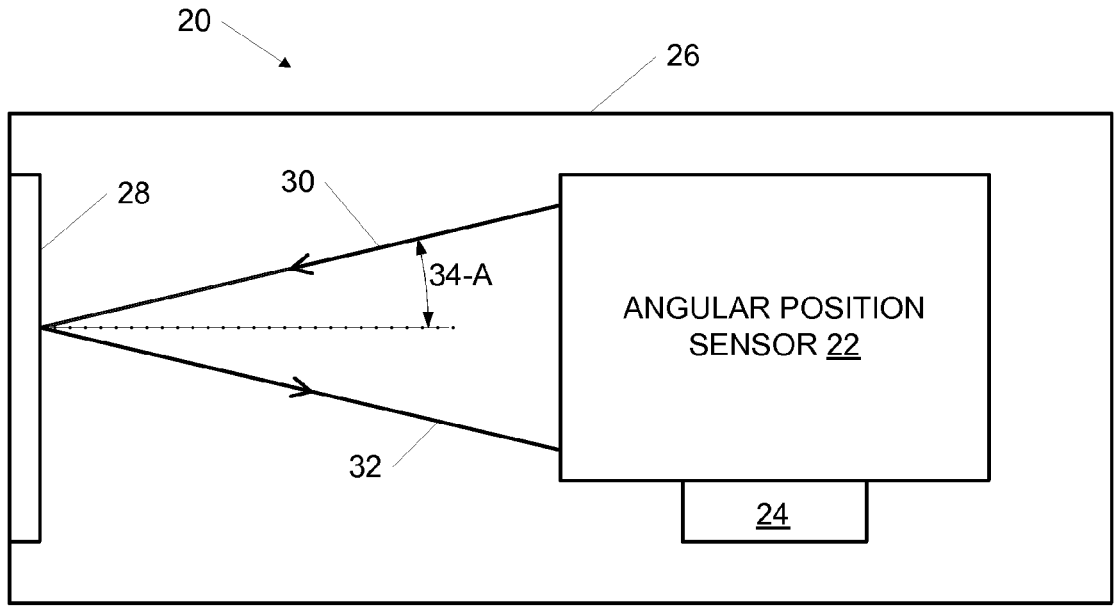
FIGS. 1A and 1B are block diagrams of a first embodiment of an angular position sensor system having an angular position sensor and a platform with a reflecting element.
Figure 1B:
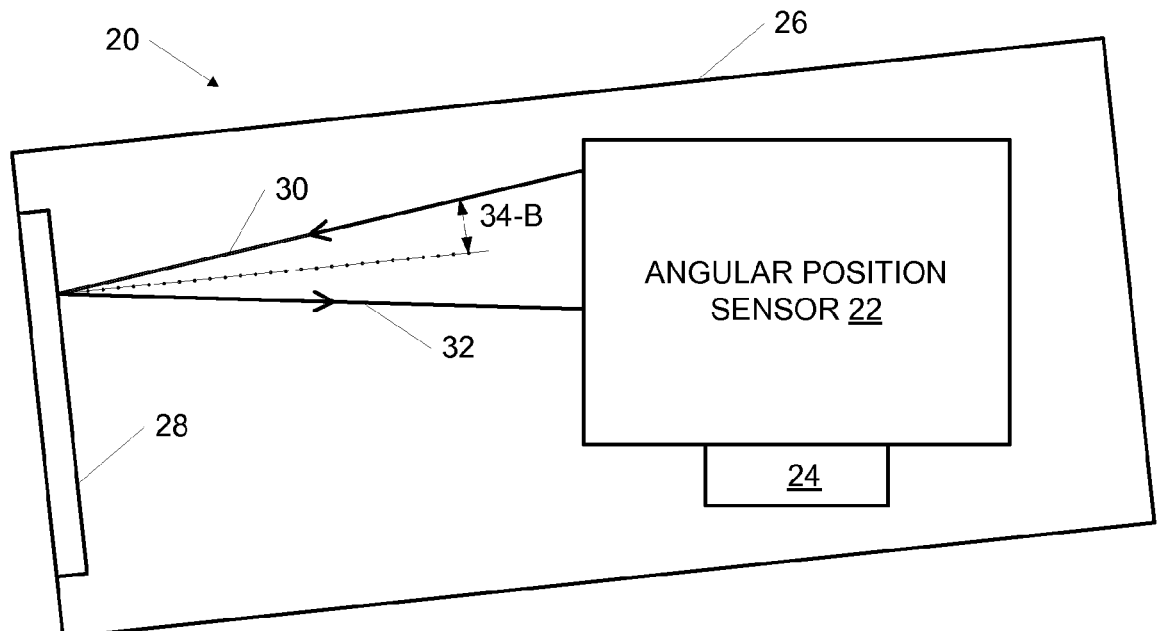

FIGS. 1A and 1B show a first embodiment of an angular position sensor system 20 having an angular position sensor 22, an isolation system 24, a platform 26, and a reflecting element 28.

The angular position sensor system 20 operates in the environment of the platform 26. The platform 26 can be a vehicle such as an aircraft, UAV, boat, car, or truck. The platform 26 can also be any device that requires on-board attitude measurements. The reflecting element 28 is rigidly attached to the platform 26, so that as the platform 26 moves, the reflecting element 28 moves with it. The reflecting element 28 may be a Littrow grating or holographic element. The angular position sensor 22 is attached to the platform 24 by the isolation system 24 such that angular movement of the platform 26 is not translated to the sensor 22. The isolation system 24 can be a gyroscopic system.

The reflecting element 28 is configured to, when illuminated by white light or any broadband source, reflect a particular color as a function of its angle relative to the light source. Generally, the reflecting element 28 may be governed by the grating equation: $2d = \lambda \sin(\theta)$. In this equation, d is a grating period, θ is the incidence angle of the light relative to the reflecting element 28, and λ is a wavelength of light reflected back.

Figure 2:
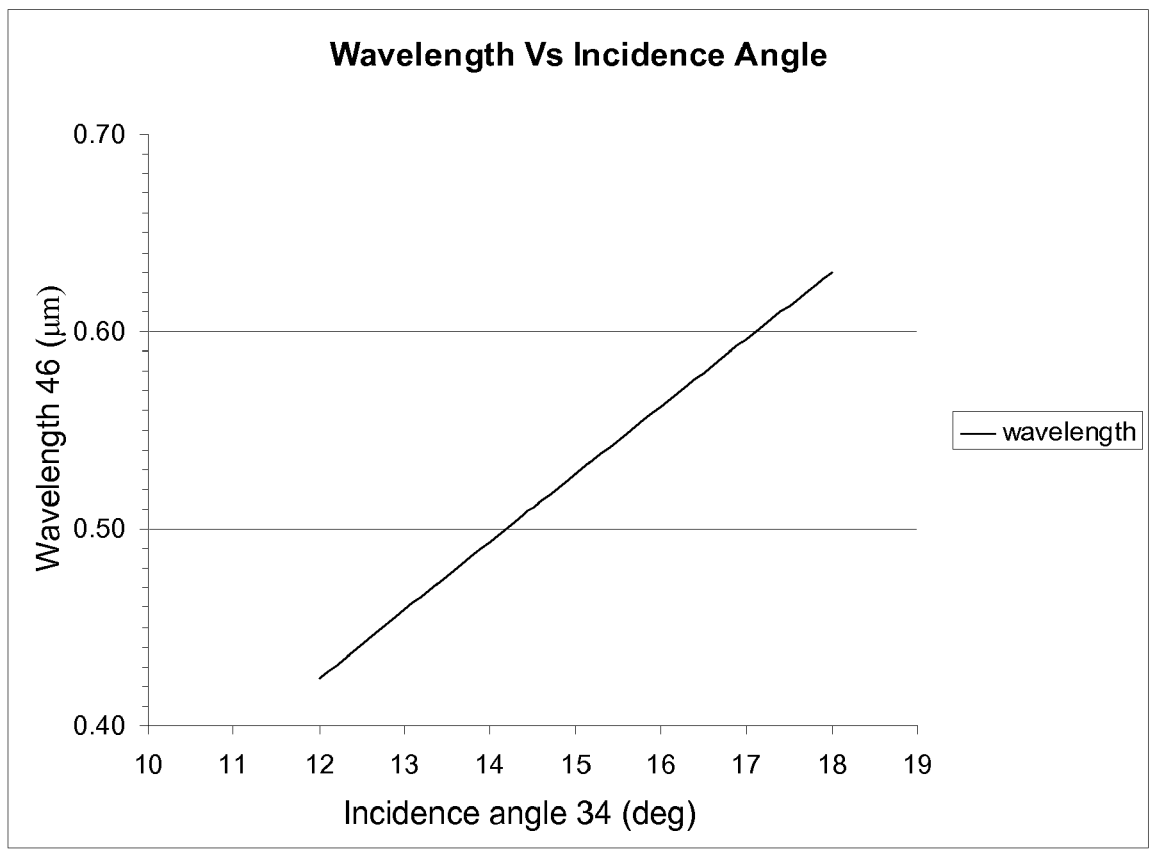
FIG. 2 is a graph showing wavelength versus incidence angle of a Littrow grating.

FIG. 2 is a graph showing a change in wavelength 46 (i.e., color) versus incidence angle 34 for an example reflecting element 28. In this example, the grating period d is set to one (1) micrometer with a nominal fifteen (15) degree incidence angle 34. The following table shows that for the example reflecting element 28 of FIG. 2, a range of incidence angles 34 yield the reflected light beam 32 in a range of wavelengths 46 that correspond to a visible color.

| Incidence Angle 34 | Wavelength 46 | Color |
|---|---|---|
| ~12° to ~13° | 0.42 µm to 0.45 µm | Violet light |
| ~13° to ~14° | 0.45 µm to 0.49 µm | Blue light |
| ~14° to ~16° | 0.49 µm to 0.56 µm | Green light |
| ~16° to ~17° | 0.56 µm to 0.59 µm | Yellow light |
| ~17° to ~18° | 0.59 µm to 0.63 µm | Orange light |

As the platform 26 undergoes angular movement from its position in FIG. 1A to FIG. 1B, the angular position sensor 22 does not undergo angular movement. The isolation system 24 isolates the sensor 22 from the movement of the platform 26. Such isolation can be achieved in various ways known in the art including gyroscopic means. The sensor 22 is configured to produce an emitted light beam 30 at a stationary point in a particular direction as a result of the isolation provided by the isolation system 24. As the platform 26 moves from its position in FIG. 1A to FIG. 1B, the emitted light beam 30 strikes the reflecting element 28 at different angles as illustrated by incidence angles 34-A and 34-B. It should be noted that incidence angles 34-A and 34-B are exaggerated in FIGS. 1A and 1B for illustrative purposes. Upon striking the reflecting element 28, part of the emitted light beam 30 is reflected back towards the sensor 22 as a reflected light beam 32. The reflected light beam 32 has a wavelength/color characteristic that is a function of the angle of incidence 34 of the emitted light beam 30 from a normal of the reflecting element 28. The wavelength of the reflected light beam 32 is analyzed by the sensor 22 to determine the incidence angle 34 and ultimately the angular position (i.e., attitude) of the platform 26.

For example, a possible application of the angular position sensor system is now discussed. The platform 26 is the hull of an airplane. The reflecting element 28 is a Littrow grating that is affixed to hull of the plane near the left wing of the plane. The sensor 22 is vibrationally isolated by a gyroscopic arrangement acting as the isolation system 24. The sensor 22 emits the emitted light beam 30 towards the reflecting element 28 by the wing of the plane. The reflecting element 28 reflects the reflected light beam 32 that is a particular wavelength of green light back toward the sensor 22. The sensor 22 determines that the particular wavelength of green light corresponds to the nominal incidence angle 34 of fifteen (15) degrees. The sensor 22 further determines that the nominal incidence angle 34 of fifteen (15) degrees corresponds to a null roll angle (wings of plane are aligned with the horizon).

If the plane banks to the left, the hull rotates about sensor 22. The reflecting element 28 reflects the reflected light beam 32 that is now a particular wavelength of violet light back toward the sensor 22. The sensor 22 determines that the particular wavelength of violet light corresponds to the incidence angle 34 of twelve (12) degrees. The sensor further determines that the incidence angle 34 of twelve (12) degrees corresponds to a roll angle of about a three (3) degree bank to the left (3=15−12).

Figure 3:
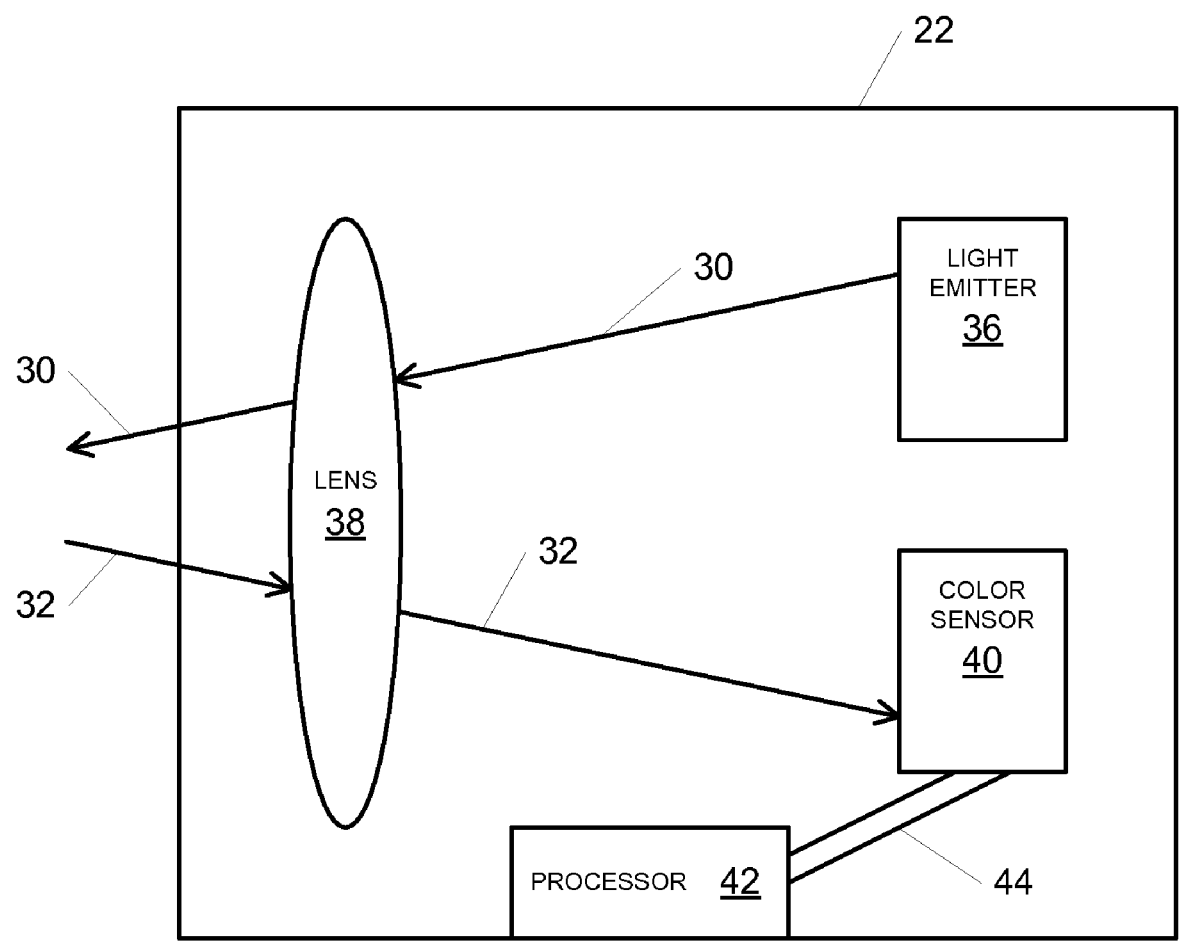
FIG. 3 is a block diagram of the angular position sensor of FIG. 1.

FIG. 3 shows an embodiment of the angular position sensor 22 having a light emitter 36, a collimating lens 38, a color sensor 40, a processor 42, and a communications link 44.

The light emitter 36 and the color sensor 40 are disposed on one side of the collimating lens 38. The light emitter 36 may be a white light emitting diode (LED) or some other source of white/broadband light. The color sensor 40 may be a device such as the TCS 230 Color Sensing IC produced by Texas Advanced Optoelectronic Solutions. The processor 42 is connected to the color sensor 40 by the communications link 44. The communications link 44 may be an electrical wire or some other means of data communication such as an optical link, rf radio serial connection, or CDMA wireless connection.

The light emitter 36 is configured to produce the emitted light beam 30 toward the collimating lens 38. The collimating lens 38 collimates and directs the emitted light beam 30 towards the external reflecting element 28 (FIG. 1A). The external reflecting element 28 reflects the reflected light beam 32, and the collimating lens 38 focuses the reflected light beam 32 towards the color sensor 40. The color sensor 40 is configured to detect and identify the wavelength of the reflected light beam 32.

The color sensor 40 does not need to be a full-image-capture device. For example, the TCS 230 Color Sensing IC produced by Texas Advanced Optoelectronic Solutions features a grid of planar 64 photodiodes divided by red, green, blue, and clear filters to assess primary color and overall intensity providing ten (10) to twelve (12) bit resolution per color channel. Two programming pins allow identification of which set of photodiodes report via the output pin.

The processor 42 receives the wavelength information of the reflected light beam 32 from the color sensor 40. The processor 42 utilizes the wavelength of the reflected light beam 32 to calculate the incidence angle 34. For example, if the TCS 230 Color Sensing IC is used as the color sensor 40, the processing of the data takes each of the three color outputs (R,G,B) from the color sensor 40 and converts the intensities of the measured R,G,B wavelengths into a corresponding monochrome wavelength. The corresponding monochrome wavelength is then used to calculate the incidence angle 34. The conversion of R,G,B wavelengths into a monochrome wavelength is well known in the art. The calculation of the monochrome wavelength into the incidence angle 34 is accomplished by using a function similar to that which is shown in FIG. 2.

For example, a mapping technique may be used to map each color into the three wavelengths, allowing accurate color selection to 10-12 bits per channel. Three (3) 12-bit words representing the R,G,B wavelengths is converted into a wavelength represented by about 12-bits. A 12-bit wavelength measurement results in a high precision measurement of the incidence angle 34.

Additionally, the processor 42 is configured to convert the calculated incidence angle 34 into a usable indication signal representing the attitude of the platform 26. This usable indication signal is generated very quickly to give an instantaneous measure of pitch, yaw or roll.

Figure 4:
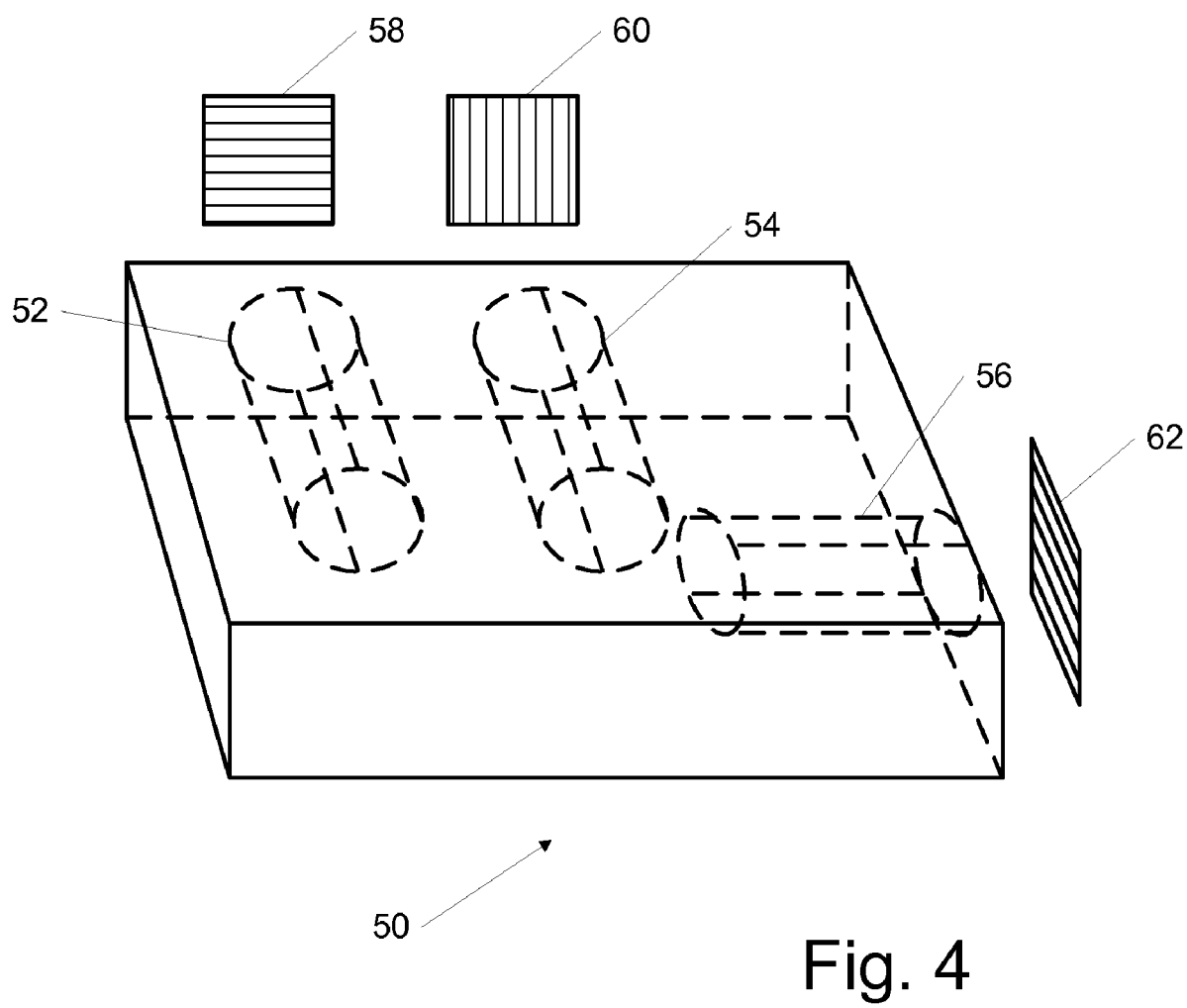
FIG. 4 is perspective view of a second embodiment of an angular position sensor system having a plurality of position sensors and a platform with a plurality of reflecting elements.

FIG. 4 shows a second embodiment of an angular position sensor system 50 having a pitch angular position sensor 52, a yaw angular position sensor 54, a roll angular position sensor 56, a pitch reflecting element 58, a yaw reflecting element 60, and a roll reflecting element 62.

The pitch angular position sensor 52 and yaw angular position sensor 54 are positioned parallel to each other and facing the pitch reflecting element 58 and the yaw reflecting element 60 respectively. The pitch reflecting element 58 has spaced apart parallel lines that are arranged horizontally, while the yaw reflecting element 60 has spaced apart parallel lines that are arranged vertically. The roll angular position sensor 56 is positioned perpendicularly to the pitch angular position sensor 52 and yaw angular position sensor 54. The roll angular position sensor 56 faces the roll reflecting element 62. The roll reflecting element 62 has spaced apart parallel lines that are arranged horizontally. Each of the pitch reflecting element 58, the yaw reflecting element 60, and the roll reflecting element 62 are all attached to a unitary structure (i.e. the surrounding walls of the platform 26).

Each of the pitch angular position sensor 52, the yaw angular position sensor 54, and the roll angular position sensor 56 are structured and behave similarly to the angular position sensor 22 shown in FIG. 3. However, when multiple angular position sensors 22 are used, it is not necessary that they each have their own processor 42. In fact, it may be preferable to have each of the angular position sensors provide the output from their respective color sensors 40 into a single processor.

During platform movement, as each of the pitch reflecting element 58, the yaw reflecting element 60, and the roll reflecting element 62 move together, the group of the pitch angular position sensor 52, the yaw angular position sensor 54, and the roll angular position sensor 56 instantaneously measure all the three-dimensional attitude readings of pitch, yaw, and roll.

Figure 5:
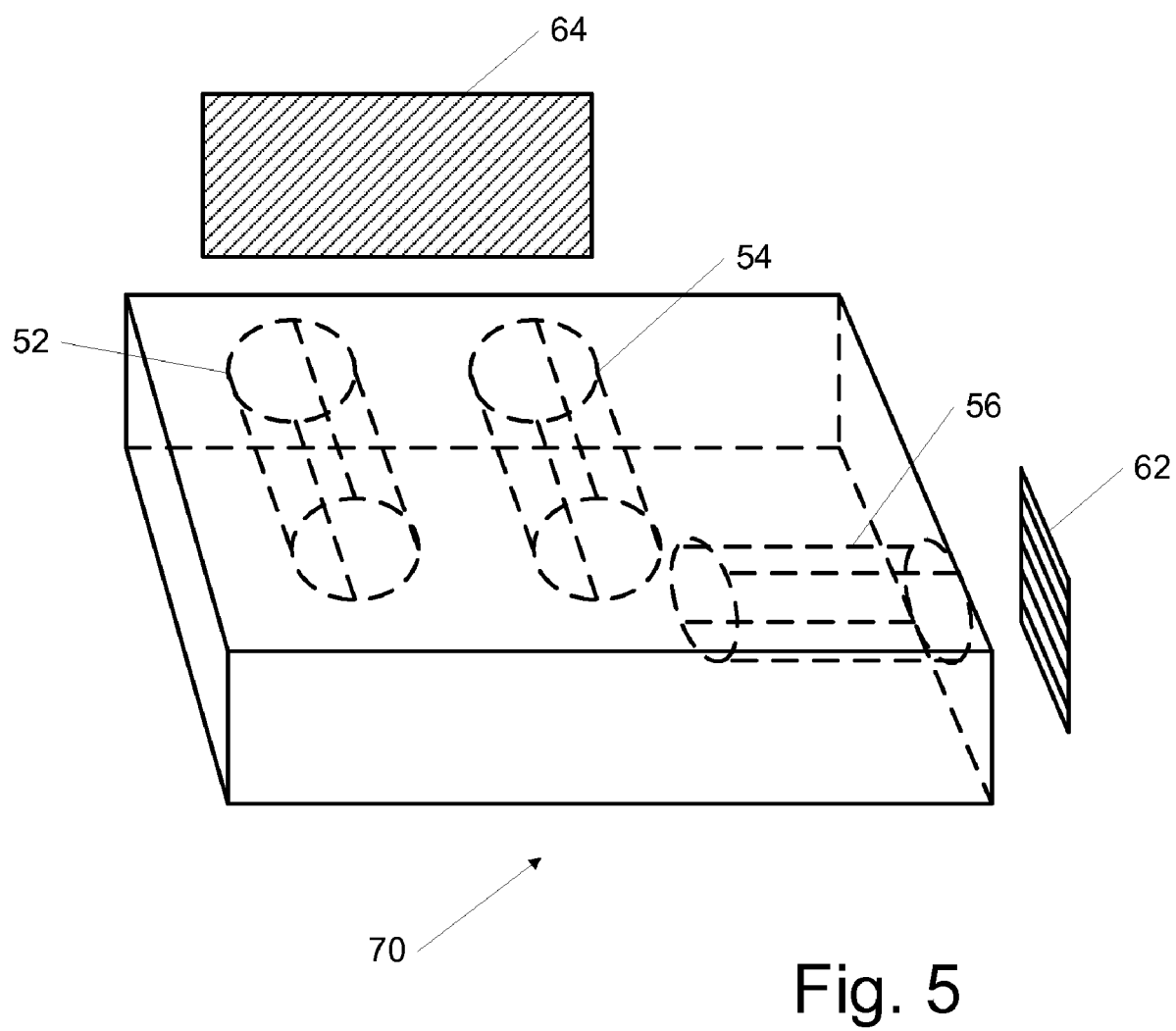
FIG. 5 is perspective view of a third embodiment of an angular position sensor system having a plurality of position sensors and a platform with a plurality of reflecting elements.

FIG. 5 shows a third embodiment of an angular position sensor system 70 having the pitch angular position sensor 52, the yaw angular position sensor 54, the roll angular position sensor 56, a pitch/yaw reflecting element 64, and the roll reflecting element 62.

The pitch angular position sensor 52 and yaw angular position sensor 54 are positioned parallel to each other and both face the pitch/yaw reflecting element 64. The pitch/yaw reflecting element 64 has spaced apart parallel lines that are arranged at forty-five (45) degrees. The roll angular position sensor 56 is positioned perpendicularly to the pitch angular position sensor 52 and yaw angular position sensor 54. The roll angular position sensor faces the roll reflecting element 62. The roll reflecting element 62 has spaced apart parallel lines that are arranged horizontally. Both of the pitch/yaw reflecting element 64, and the roll reflecting element 62 are all attached to a unitary structure (i.e. the surrounding walls of the platform 26).

The angular position sensor system 70 behaves similarly to the angular position sensor 50 shown in FIG. 4. However, in the angular position sensor system 70, both the pitch angular position sensor 52 and the yaw angular position sensor 54 interact with the same pitch/yaw reflecting element 64. The same pitch/yaw reflecting element 64 can be used for both the pitch angular position sensor 52 and the yaw angular position sensor 54 because the forty-five (45) degree orientation of the pitch/yaw reflecting element 64 allows for both pitch and yaw to be detected.

Figure 6:
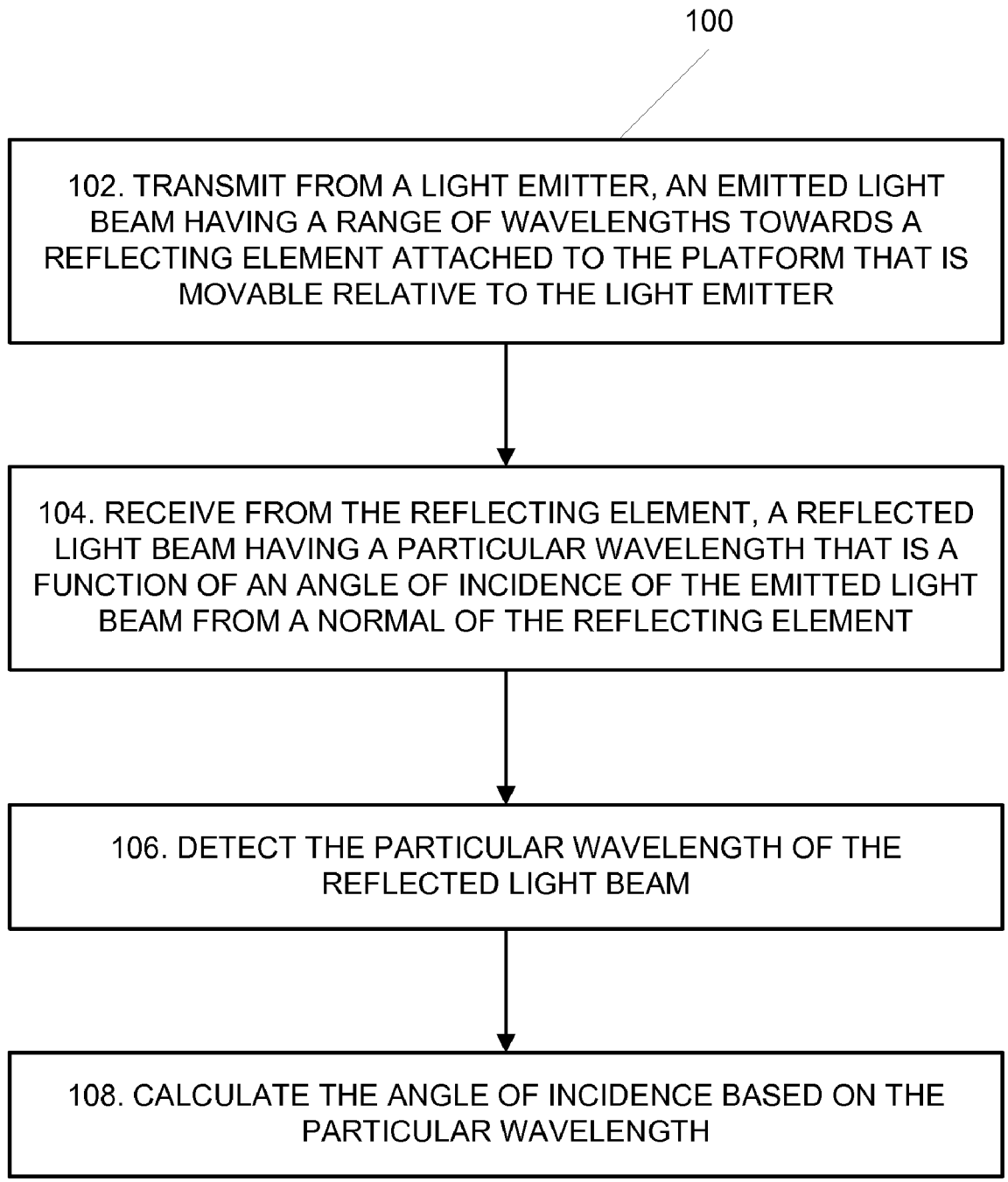
FIG. 6 is a flowchart of a method for sensing angular position.

FIG. 6 describes a method 100 for sensing angular position. Step 102 is to transmit from a light emitter, an emitted light beam having a range of wavelengths towards a reflecting element attached to the platform that is movable relative to the light emitter. Step 104 is to receive from the reflecting element, a reflected light beam having a particular wavelength that is a function of an angle of incidence of the emitted light beam from a normal of the reflecting element. Step 106 is to detect the particular wavelength of the reflected light beam. Step 108 is to calculate the angle of incidence based on the particular wavelength.

While various embodiments of the invention have been particularly shown and described, it will be understood by those skilled in the art that various changes in form and details may be made therein without departing from the spirit and scope of the invention as defined by the appended claims.

For example, the angular position sensor system 20 is described above in geometries containing one or three angular position sensors 22. However, the angular position sensor system 20 can be arranged in many different geometries to allow one, two, three, or more simultaneous measurements. Additionally, the angular position sensor 20 is shown to utilize the collimating lens 38. However it should be understood that additional optics may also be used depending on the geometric configuration. For example, if there is a large separation between the reflecting element 28 and the sensor 22, additional optics may placed near the reflecting element 28 to condition the emitted light beam 30.

What is claimed is:

1. An angular position sensor comprising:
    a light emitter configured to transmit an emitted light beam having a range of wavelengths toward a reflecting element that is configured to produce a reflected light beam having a particular wavelength that is a function of an angle of incidence of the emitted light beam from a normal of the reflecting element;
    a color sensor in proximity to and fixed relative to the light emitter and configured to (i) receive the reflected light beam, (ii) detect the particular wavelength of the reflected light beam, and (iii) transmit a color signal indicating the particular wavelength of the reflected light beam; and
    processing circuitry disposed in electrical communication with the color sensor and configured to receive the color signal and calculate the angle of incidence based on the particular wavelength.

2. The angular position sensor of claim 1, further comprising a collimating lens in proximity to and fixed relative to the light emitter and configured to direct the emitted light beam towards the reflecting element and direct the reflected light beam towards the color sensor.

3. The angular position sensor of claim 1, wherein the light emitter is a white light emitting diode (LED).

4. The angular position sensor of claim 1, wherein the color signal includes a red light intensity, a green light intensity, and a blue light intensity; and
    wherein the processing circuitry is configured to (i) convert the red light intensity, the green light intensity, and the blue light intensity into a corresponding color value, and (ii) calculate the angle of incidence based on a known linear relationship between the corresponding color value and the angle of incidence that results from a characteristic of the reflecting element.

5. The angular position sensor of claim 1, wherein the reflecting element is a Littrow grating, the Littrow grating having a relationship between a grating period (d), the angle of incidence ($\theta$), and the particular wavelength ($\lambda$) governed by an equation of $2d = \lambda \sin(\theta)$.

6. An angular position sensor system comprising:
    a platform configured to move through a range of motion and having a reflecting element that is configured to produce a reflected light beam having a particular wavelength that is a function of an angle of incidence of a emitted light beam from a normal of the reflecting element; and
    an angular position sensor disposed within the movable platform and isolated from movement of the platform, the angular position sensor having:

a light emitter configured to transmit the emitted light beam having a range of wavelengths toward the reflecting element, a color sensor in proximity to and fixed relative to the light emitter and configured to (i) receive the reflected light beam, (ii) detect the particular wavelength of the reflected light beam, and (iii) transmit a color signal indicating the particular wavelength of the reflected light beam and processing circuitry disposed in communication with the color sensor and configured to receive the color signal and calculate the angle of incidence based on the particular wavelength.

7. The angular position sensor system of claim 6, wherein the angular position sensor further includes a collimating lens in proximity to and fixed relative to the light emitter and configured to direct the emitted light beam towards the reflecting element and direct the reflected light beam towards the color sensor.

8. The angular position sensor system of claim 6, wherein the light emitter is a white light emitting diode (LED).

9. The angular position sensor system of claim 6:
wherein the reflecting element is a first reflecting element, the reflected light beam is a first reflected light beam, the particular wavelength is a first particular wavelength, the angle of incidence is a first angle of incidence, the emitted light beam is a first emitted light beam, the normal is a first normal, the angular position sensor is a first angular position sensor, the light emitter is a first light emitter, the color sensor is a first color sensor, and the color signal is a first color signal;

wherein the platform has a second reflecting element that is configured to produce a second reflected light beam having a second particular wavelength that is a function of a second angle of incidence of a second emitted light beam from a second normal of the second reflecting element; and further comprising a second angular position sensor disposed within the movable platform and isolated from the range of motion, the second angular position sensor having:
  a second light emitter configured to transmit the second emitted light beam having a range of wavelengths toward the second reflecting element, and
  a second color sensor in proximity to and fixed relative to the second light emitter and configured to (i) receive the second reflected light beam, (ii) detect the second particular wavelength of the second reflected light beam, and (iii) transmit a second color signal indicating the second particular wavelength of the second reflected light beam to the processing circuitry, the processing circuitry further configured to calculate the second angle of incidence based on the second particular wavelength.

10. The angular position sensor system of claim 9:
wherein the first reflecting element has a first diffraction grating having a first set of spaced apart parallel lines;
wherein the second reflecting element has a second diffraction grating having a second set of spaced apart parallel lines; and
wherein the first reflecting element and the second reflecting element are arranged coplanarly with each other, the first set of spaced apart parallel lines orthogonal to the second set of spaced apart parallel lines.

11. The angular position sensor system of claim 9:
wherein the platform has a third reflecting element that is configured to produce a third reflected light beam having a third particular wavelength that is a function of a third angle of incidence of a third emitted light beam from a third normal of the third reflecting element; and further comprising a third angular position sensor disposed within the movable platform and isolated from movement of the platform, the third angular position sensor having:
  a third light emitter configured to transmit the third emitted light beam having a range of wavelengths toward the third reflecting element,
  a third color sensor in proximity to and fixed relative to the third light emitter and configured to (i) receive the third reflected light beam, (ii) detect the third particular wavelength of the third reflected light beam, and (iii) transmit a third color signal indicating the third particular wavelength of the third reflected light beam to the processing circuitry, the processing circuitry further configured to calculate the third angle of incidence based on the third particular wavelength.

12. The angular position sensor system of claim 9:
wherein the first reflecting element has a first diffraction grating having a first set of spaced apart parallel lines;
wherein the second reflecting element has a second diffraction grating having a second set of spaced apart parallel lines;
wherein the third reflecting element has a third diffraction grating having a third set of spaced apart parallel lines;
wherein the first reflecting element and the second reflecting element are arranged coplanarly with each other, the first set of spaced apart parallel lines orthogonal to the second set of spaced apart parallel lines; and
wherein the third reflecting element is arranged in a plane orthogonal to the first reflecting element.

13. The angular position sensor system of claim 6:
wherein the reflecting element is a first reflecting element, the reflected light beam is a first reflected light beam, the particular wavelength is a first particular wavelength, the angle of incidence is a first angle of incidence, the emitted light beam is a first emitted light beam, the normal is a first normal, the angular position sensor is a first angular position sensor, the light emitter is a first light emitter, the color sensor is a first color sensor, and the color signal is a first color signal;

wherein the first reflecting element is further configured to produce a second reflected light beam having a second particular wavelength that is a function of a second angle of incidence of a second emitted light beam from the first normal of the first reflecting element; and further comprising a second angular position sensor disposed within the movable platform and isolated from movement of the platform, the second angular position sensor having:
  a second light emitter configured to transmit the second emitted light beam having a range of wavelengths toward the first reflecting element,
  a second color sensor in proximity to and fixed relative to the second light emitter and configured to (i) receive the second reflected light beam, (ii) detect the second particular wavelength of the second reflected light beam, and (iii) transmit a second color signal indicating the second particular wavelength of the second reflected light beam to the processing circuitry, the processing circuitry further configured to calculate the second angle of incidence based on the second particular wavelength.

14. The angular position sensor system of claim 13:
wherein the platform has a second reflecting element configured to produce a third reflected light beam having a third particular wavelength that is a function of a third angle of incidence of a third emitted light beam from a second normal of the second reflecting element; and further comprising a third angular position sensor disposed within the movable platform and isolated from movement of the platform, the third angular position sensor having:
- a third light emitter configured to transmit the third emitted light beam having a range of wavelengths toward the second reflecting element,
- a third color sensor in proximity to and fixed relative to the third light emitter and configured to (i) receive the third reflected light beam, (ii) detect the third particular wavelength of the third reflected light beam, and (iii) transmit a third color signal indicating the third particular wavelength of the third reflected light beam to the processing circuitry, the processing circuitry further configured to calculate the third angle of incidence based on the third particular wavelength.

15. The angular position sensor system of claim 6, wherein the range of motion of the movable platform is limited to positions that result in an angle of incidence of the emitted light beam from the normal of the reflecting element that is less than twenty (20) degrees.

16. The angular position sensor system of claim 6, wherein the range of motion is restricted to angular motion along an axis of the angular position sensor.

17. A method for sensing angular movement of a moving platform comprising:
- transmitting from a light emitter, an emitted light beam having a range of wavelengths towards a reflecting element attached to the platform that is movable relative to the light emitter;
- receiving from the reflecting element, a reflected light beam having a particular wavelength that is a function of an angle of incidence of the emitted light beam from a normal of the reflecting element;
- detecting the particular wavelength of the reflected light beam; and
- calculating the angle of incidence based on the particular wavelength.

* * * * *